United States Patent [19]

Lindsay et al.

[11] 4,273,065
[45] Jun. 16, 1981

[54] ENERGY ABSORBING DEVICE

[75] Inventors: Ronald J. Lindsay, Hudson; Clifford W. Cross, Akron, both of Ohio

[73] Assignee: The Goodyear Tire & Rubber Company, Akron, Ohio

[21] Appl. No.: 101,047

[22] Filed: Dec. 6, 1979

[51] Int. Cl.³ .............................................. B63B 59/02
[52] U.S. Cl. ..................................... 114/219; 138/115; 114/220; 428/36
[58] Field of Search ................. 114/219, 220; 138/115; 428/36

[56] References Cited

U.S. PATENT DOCUMENTS

| 3,261,320 | 7/1966 | Leonard | 114/219 |
| 3,738,695 | 6/1973 | McBee | 114/219 |
| 3,941,157 | 3/1976 | Barnett | 138/115 |
| 4,143,612 | 3/1979 | Ticknor | 114/219 |
| 4,194,034 | 3/1980 | Rijnders | 428/36 |

Primary Examiner—William R. Dixon, Jr.
Attorney, Agent, or Firm—D. M. Ronyak

[57] ABSTRACT

An energy absorption device of elastomeric material is disclosed which is particularly adapted for marine use. The device has an overall configuration resembling that of a cylinder and includes a central bore extending axially throughout its length and a plurality of additional bores extending axially throughout its length. The additional bores are symmetrically arranged around and between the inner and outer peripheral surfaces of the device.

9 Claims, 4 Drawing Figures

ENERGY ABSORBING DEVICE

The abstract is not to be taken as limiting the invention of this application and in order to understand the full nature and extent of the technical disclosure of the application reference must be made to the accompanying drawings and the following detailed description.

This invention relates to enerby absorbing devices such as fenders or the like and more particularly to an improved cylindrical dock fender configuration suitable for use in cushioning very large loads which may occur in marine installations.

Energy abosrbing devices such as dock fenders are extensively employed to prevent damage which would otherwise be caused by contact between two relatively movable bodies. Known fendering devices are formed of elastomeric material. These devices have been mounted on docks or ships to cushion impacts which are transmitted between the ship and the dock.

Known energy absorption devices include fenders having an overall configuration resembling an elongated cylinder including a central bore extending axially therethrough. The energy absorbing device described herein is an improvement in this general category of fenders. While such known fenders perform the job for which they are designed as evidenced by their worldwide use, it is desirable that the energy absorbing capacity of dock fenders be increased without use of increased quantities of elastomeric material or increasing the overall size of the energy absorption device. An energy absorption device made in accordance with the present invention is believed to represent a significant improvement in energy absorption capability when compared to a conventional single bore cylindrical dock fender of known construction of the same overall size, weight and material.

An energy absorption device in accordance with the present invention has an overall configuration resembling that of an elongated cylinder and includes a central bore extending axially throughout its length and a plurality of additional bores extending axially throughout its length. The additional bores are symmetrically arranged around and between the inner and outer peripheral surfaces of the device. Preferably, the central bore is from about 1/6 to ⅓ of the overall diameter of the device and most preferably about ¼ of the overall diameter of the device. The additional bores are preferably of a diameter of about $\pi/16$ times the overall diameter of the device. The bores are preferably circular in configuration. In another preferred embodiment the additional bores are ovular in configuration with their smaller ends directed toward the longitudinal axis of the device. Preferably, an unever number of additional bores surround the central bore. Preferably, at least five additional bores surround the central bore.

BRIEF DESCRIPTION OF THE DRAWINGS

FIGS. 1 and 2 illustrate one preferred embodiment of the present invention showing an energy absorption device mounted in a typical dock installation. The energy absorption device is designated generally at 10 and is suspended on a chain 14 whose ends are attached to the dock with the longitudinal axis 14 of the device being generally horizontal but free to take a natural catenary configuration. The mounting of the device according to the invention is comparable to that used with known single bore cylindrical dock fenders.

Referring to FIG. 2, it is seen that the fender 10 includes a central bore 16 which is preferably of a circular or rounded configuration. The central bore 16 is preferably from about 1/6 to ⅓ of the overall diameter D of the device 10 and most preferably about ¼ of the overall diameter D of the device.

Figure 1:
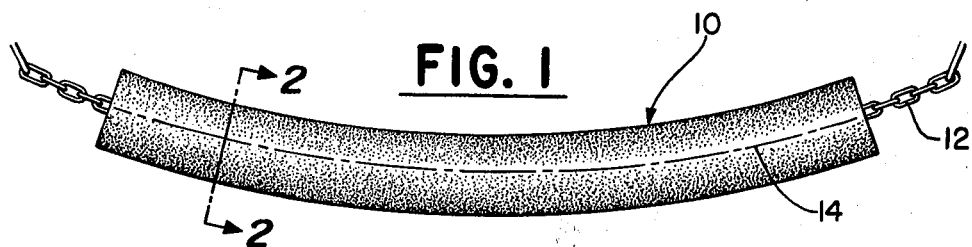
FIG. 1 is a front elevational view illustrating a typical installation of an embodiment of a dock fender in accordance with the present invention.

The device 10 is of substantially uniform cross-sectional configuration throughout its length.

Positioned midway of the inner peripheral surface 17 and the outer peripheral surface 18 of the device 10 are a plurality of identically sized additional holes or bores 19 which extend axially throughout the fender. "Axially" as used herein means in the direction of or parallel to the longitudinal axis 14 of the device. These additional bores 19 are of approximately circular cross-sectional configuration. The diameter 20 of each of the additional bores 19 is preferably less than the diameter 21 of the central bore 16. Preferably, there are an uneven number of additional holes 19 surrounding the central bore 16. In a preferred embodiment five additional bores 19 are present each having a diameter 10 of about $\pi/16$ times the overall diameter 15 of the device. The spacing between adjacent ones of the five additional bores 19 is also about $\pi/16$ times the overall diameter 15 of the device 10. Thus, the additional holes 19 are symmetrically positioned with regard to one another and with regard to the inner 17 and outer 18 peripheral surfaces of the fender 10. The fender 10 is radially symmetrical about its longitudinal axis 14. "Radially" as used herein means in the direction of or parallel to any line which is perpendicular to and intersects the longitudinal axis of the device.

Figure 2:
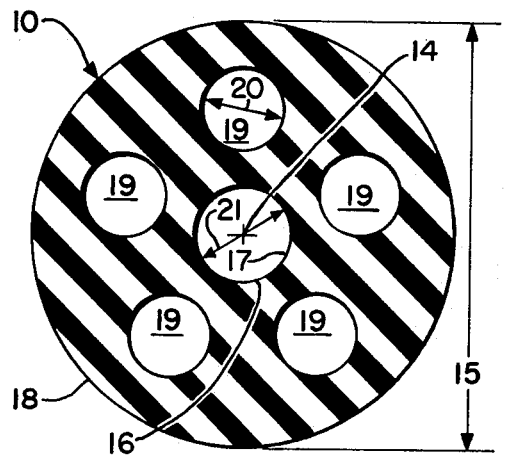
FIG. 2 is an enlarged cross-sectional view taken along lines 2—2 of FIG. 1.
Figure 3:
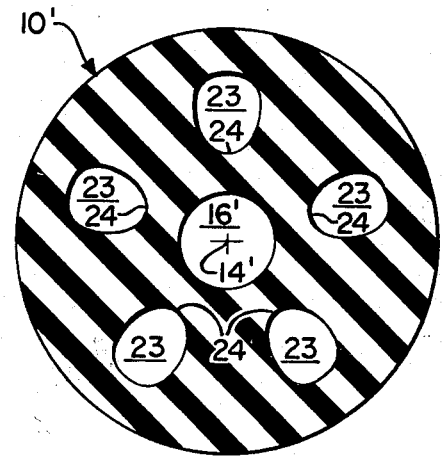
FIG. 3 is an enlarged cross-sectional view of another embodiment of an energy absorbing device according to the invention.

Referring to the embodiment illustrated in FIG. 3, it is seen that the device 10' includes additional bores 23 which are oval shaped rather than being circular in cross-section. The smaller end 24 of each additional bore 23 is directed radially inwardly toward the longitudinal axis 14' of the device. As in the embodiment shown in FIG. 2, the additional bores 23 are arranged symmetrically about the central bore 16' which is centered on the longitudinal axis 14' of the device 10'.

In multi-bore fenders according to the invention, it is believed desirable that the central bore range from about 5.8 percent to about 11.3 percent of the remaining solid cross-sectional area and most preferably about 8.3 percent of the remaining solid cross-sectional area. It is believed desirable that the additional bores when taken together range from about 22.2 percent to about 27.5 percent of the remaining solid cross-sectional area and most preferabily about 24.7 percent of the remaining solid cross-sectional area. The remaining solid cross-sectional area is the total cross-sectional area of the device minus the cross-sectional area of all of the bores. The remaining cross-sectional area is that occuppied by elastomeric material.

Figure 4:
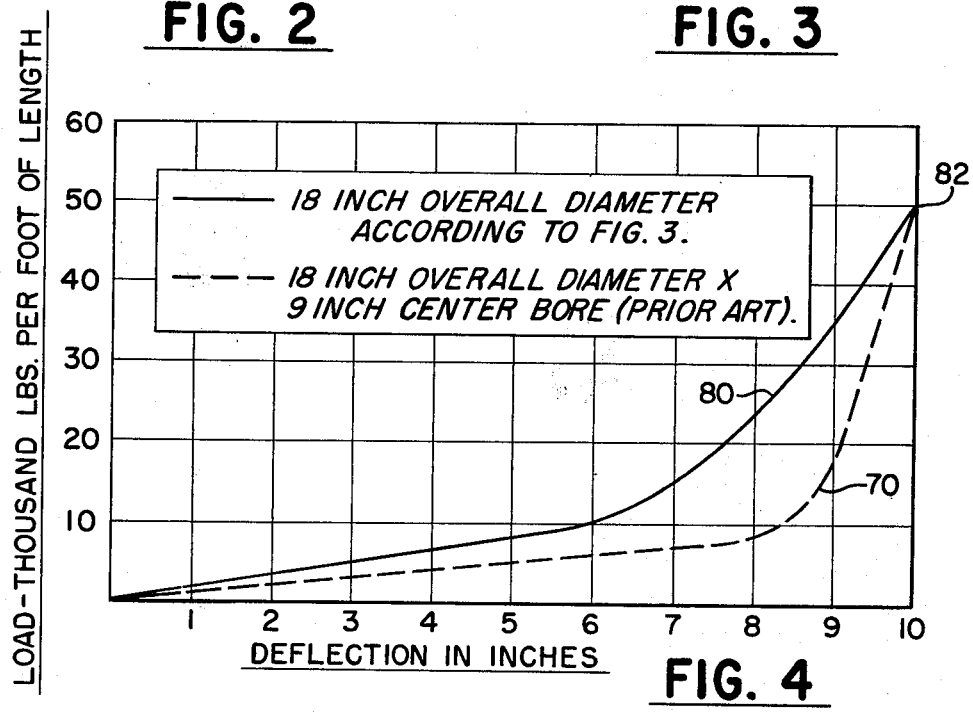
FIG. 4 graphically illustrates the energy absorbed versus radial deflection of two energy absorbing devices.

The effectiveness of a multi-bore cylindrical dock fender made in accordance with the invention in comparison to a cylindrical dock fender of known construction and having a single central bore is shown in FIG. 4. The abscissa or horizontal scale of the graph represents the radial deflection in inches of the respective fender. The ordinate or vertical scale of the graph in FIG. 3 represents the load in thousand pounds per foot of length of the respective fender. A dashed line 70 represents the load-deflection characteristics of a known eighteen inch overall diameter cylindrical fender having a single central bore therethrough of nine inches diameter. A solid line 80 represents the load-deflection characteristics of a multi-bore dock fender having a configuration similar to the embodiment illustrated in FIG. 3. The multi-bore fender is of eighteen inches overall diameter, of the same material and of the same weight per unit of length as the known single bore fender with which it is compared. The area of central bore of the multi-bore fender is about 8.3 percent of the remaining solid area. The area of the additional bores taken together is about 24.7 percent of the remaining solid area. Since the area under the load-deflection curve represents the energy absorbed, in FIG. 4 it is shown that at all deflections greater than zero a dock fender made in accordance with the embodiment of the invention shown in FIG. 3 absorbs a greater amount of energy than a known single bore cylindrical dock fender at that same deflection when the two are of the same overall diameter, material and weight per unit length. The values illustrated are based on deflection after the respective fenders were broken in rather than on initial compression. At point 82 and beyond the load-deflection curve is the same for both fenders since all void areas are eliminated at ten inches deflection and thus any further loading is reacted to by the elastomer only acting as a solid mass.

An energy absorbing device according to the invention may be manufactured by extrusion of any suitable vulcanizable or curable elastomeric composition. Such compositions are well known to those skilled in the art.

While certain representative embodiments and details have been shown for the purpose of illustrating the invention, it will be apparent to thse skilled in the art that various changes and modifications may be made therein without departing from the scope or spirit of the invention.

What is claimed is:

1. An elastomeric energy absorption device having an overall configuration resembling that of an elongated cylinder and including a central bore extending axially throughout the length thereof and a plurality of additional holes extending axially through the length thereof, said additional holes being symmetrically positioned around and between the inner and outer peripheral surfaces of the device, the diameter of said central bore being from about 1/6 to about ⅓ that of the overall diameter of the device.

2. The device of claim 1, wherein the central bore is surrounded by at least five additional holes.

3. The device of claim 2, wherein said central bore and said additional holes are of substantially circular cross-sectional configuration.

4. The device of claim 3, wherein said central bore diameter is about ¼ that of the overall diameter of the device and is surrounded by five additional holes located substantially midway between the inner and outer peripheral surfaces of said device.

5. The device of claim 4, wherein each of the five additional holes has a diameter of about $\pi/16$ that of the overall diameter of the device.

6. The device of claim 1, wherein the diameter of the central bore is about ¼ that of the overall diameter of the device, and the central bore is surrounded by five additional holes the center of each of which lies on a circle midway between the inner and outer peripheral surfaces of the device and when viewed in section taken perpendicular to the longitudinal axis of the device, the length of the arc of said circle within any additional hole is substantially equal to the length of the arc of said circle between any two additional holes.

7. The device of claim 1, 2 or 4 wherein said additional holes are oval-shaped with their smaller ends directed radially inwardly toward the longitudinal axis of the device.

8. The device of claim 7, wherein the sum cross-sectional area of the additional holes is from about 22.2% to about 27.5% of the remaining solid cross-sectional area of the device.

9. The device of claim 7, wherein the area of the central bore is about 8.3% of that of the remaining solid cross-sectional area of the device, and the sum cross-sectional area of the additional holes is about 24.7% of that of the remaining solid cross-sectional area of the device.

* * * * *

UNITED STATES PATENT AND TRADEMARK OFFICE
CERTIFICATE OF CORRECTION

PATENT NO. : 4,273,065
DATED : June 16, 1981
INVENTOR(S) : Ronald James Lindsay and Clifford William Cross It is certified that error appears in the above-identified patent and that said Letters Patent are hereby corrected as shown below:

Column 2, line 34, "10" should be -- 20 --.

Signed and Sealed this

Twentieth Day of April 1982

[SEAL]

Attest:

GERALD J. MOSSINGHOFF

Attesting Officer   Commissioner of Patents and Trademarks